(12) United States Patent
Soucek

(10) Patent No.: US 7,066,481 B1
(45) Date of Patent: Jun. 27, 2006

(54) BICYCLE REAR SUSPENSION

(75) Inventor: Jeffrey A. Soucek, Aliso Viejo, CA (US)

(73) Assignee: Felt Racing, LLC, Lake Forest, CA (US)

( * ) Notice: Subject to any disclaimer, the term of this patent is extended or adjusted under 35 U.S.C. 154(b) by 0 days.

(21) Appl. No.: 11/104,815

(22) Filed: Apr. 13, 2005

(51) Int. Cl.
B62K 25/28 (2006.01)

(52) U.S. Cl. .................................................. 280/284

(58) Field of Classification Search ............... 280/283, 280/284, 285, 286; 180/227
See application file for complete search history.

(56) References Cited

U.S. PATENT DOCUMENTS

| 439,095 | A | | 10/1890 | Becker |
| 578,615 | A | | 3/1897 | Travis |
| 606,323 | A | | 6/1898 | Wronski |
| 657,667 | A | | 9/1900 | Mills |
| 944,795 | A | * | 12/1909 | Leet et al. ................. 280/284 |
| 1,047,430 | A | | 12/1912 | Michaelson |
| 1,257,761 | A | | 2/1918 | Strand |
| 1,298,958 | A | | 4/1919 | Johnston |
| 1,412,012 | A | | 4/1922 | Bruno |
| 1,594,079 | A | | 7/1926 | Tanner |
| 3,833,242 | A | | 9/1974 | Thompson, Jr. |
| 3,917,313 | A | | 11/1975 | Smith et al. |
| 3,974,892 | A | | 8/1976 | Bolger |
| 4,322,088 | A | | 3/1982 | Miyakoshi et al. |
| 4,506,755 | A | | 3/1985 | Tsuchida et al. |
| 4,529,056 | A | | 7/1985 | Kreuz |
| 4,673,053 | A | | 6/1987 | Tanaka et al. |
| 4,789,174 | A | | 12/1988 | Lawwill |
| 4,828,781 | A | | 5/1989 | Duplessis et al. |
| 4,850,607 | A | | 7/1989 | Trimble |
| 4,889,355 | A | | 12/1989 | Trimble |
| 4,902,458 | A | | 2/1990 | Trimble |
| 4,951,791 | A | | 8/1990 | Creixell |
| 4,986,949 | A | | 1/1991 | Trimble |
| 4,997,197 | A | | 3/1991 | Shultz |
| 5,098,114 | A | | 3/1992 | Jones |
| 5,121,937 | A | | 6/1992 | Lawwill |
| 5,158,733 | A | | 10/1992 | Trimble |
| 5,205,572 | A | | 4/1993 | Buell et al. |
| 5,215,322 | A | | 6/1993 | Enders |
| 5,244,224 | A | | 9/1993 | Busby |
| 5,259,637 | A | | 11/1993 | Busby |
| 5,273,303 | A | | 12/1993 | Hornzee-Jones |

(Continued)

FOREIGN PATENT DOCUMENTS

DE  3033294  4/1981

(Continued)

Primary Examiner—Kevin Hurley
(74) Attorney, Agent, or Firm—Stetina Brunda Garred & Brucker

(57) ABSTRACT

A rear suspension of a bicycle may have an upper link and lower link which are pivotally connected to both a front frame and a rear frame of the bicycle such that the rear frame may rotate up and down about the front frame/front sprocket. A shock absorber may be pivotally connected to the upper link to absorb any impact forces imposed on the rear wheel and transferred to the upper link as the rear frame rotates up and down. Also, the upper link may be interconnected to the lower link with a tie link which allows the upper and lower links to work in conjunction with each other such that pedal setback is negligible when the rear wheel rides over bumps along the bike trail. Additionally, the tie link equalizes the forces caused by the rider's weight and pedaling forces.

10 Claims, 3 Drawing Sheets

U.S. PATENT DOCUMENTS

| | | |
|---|---|---|
| 5,306,036 A | 4/1994 | Busby |
| 5,335,929 A | 8/1994 | Takagaki et al. |
| 5,354,085 A | 10/1994 | Gally |
| 5,368,804 A | 11/1994 | Hwang et al. |
| 5,409,249 A | 4/1995 | Busby |
| 5,441,292 A | 8/1995 | Busby |
| 5,456,481 A | 10/1995 | Allsop et al. |
| D372,002 S | 7/1996 | Busby et al. |
| 6,036,211 A * | 3/2000 | Nohr .......................... 280/276 |
| 6,036,213 A | 3/2000 | Busby |
| 2005/0067806 A1* | 3/2005 | Weagle ................... 280/124.1 |
| 2005/0067810 A1* | 3/2005 | Weagle ....................... 280/284 |

FOREIGN PATENT DOCUMENTS

| | | |
|---|---|---|
| GB | 15332 | 0/1915 |
| GB | 220760 | 6/1923 |
| GB | 2167361 A * | 5/1986 |
| IT | 428442 | 12/1947 |
| JP | 5105168 | 4/1993 |
| WO | WO 9215477 | 8/1992 |
| WO | WO 9313974 | 7/1993 |

* cited by examiner

BICYCLE REAR SUSPENSION

BACKGROUND OF THE INVENTION

The present invention relates to a bicycle rear suspension system.

Mountain bikes are designed to be ridden over dirt trails. These dirt trails may have gravel, dirt, leaves, uneven terrain (e.g., boulders) and other elements which cause vibration and sudden jolts in the pedals, handlebar and seat of the bike. The vibration and jolts cause the bike rider to become fatigued at a faster rate compared to the fatigue rate if the rider had been riding over a smooth surface. For example, a mountain bike ridden over gravel causes vibration in the handlebar and seat. The rider must compensate for the vibration by absorbing the vibration with his/her arms and legs. As such, the rider must use additional energy to ride his/her bike over gravel. In another example, a mountain bike ridden over a mountain trail may have obstacles (e.g., boulders) that the rider must maneuver over or around. These obstacles or boulders may suddenly impact the bike's front and rear tires which are transferred to the bike's pedals, seat and handlebar. The rider must also absorb these impact forces with his/her legs and arms. Prolonged and repeated exposure to these sudden impact forces causes the rider to become fatigued at a faster rate compared to the fatigue rate if the rider had been riding over a smooth surface.

Modern mountain bikes are currently designed to reduce the amount of vibration and any impact forces transferred to the pedals, handlebar and seat. For example, mountain bikes may be installed with front shocks. The front shocks help to absorb any impact forces to the front tire and vibration caused by gravel, dirt, leaves, and obstacles on the bike trail. Similarly, mountain bikes may be fabricated with rear wheel suspension systems. These suspension systems help to absorb any vibration and sudden impact forces to the rear wheel caused by gravel, dirt, leaves, and obstacles on the bike trail. One typical rear wheel suspension system is a four bar linkage. The four bar linkage permits the rear wheel to rotate clockwise and counter clockwise about the front sprocket when the rear wheel rides over gravel, dirt, leaves, and obstacles along the bike trail. The four bar linkage is also connected to a shock absorber to absorb the impact forces caused by the terrain of the bike trail. In this way, the rear suspension system provides a smoother and more comfortable ride to the user.

Unfortunately, rear suspension systems such as the four bar linkage cause pedal setback when the rear wheel travels over the uneven terrain of the bike trail. The reason is that the rear wheel does not travel along a circular path about the front sprocket. Rather, the distance between the rear wheel (i.e., rear sprocket) and the front sprocket increases and decreases as the rear wheel is rotated about the front sprocket to absorb the impact forces caused by gravel, dirt, and obstacles along the bike trail. As such, the rider must compensate for the pedal setback causing the rider to become fatigued at a faster rate than if the rider was riding over a smooth surface. In sum, although rear suspension systems of bicycles help to reduce vibration and impact shocks by absorbing them into a shock absorber, rear suspension systems still have other inherent problems such as pedal setback.

Accordingly, there is a need in the art for an improved bicycle rear suspension that exhibits negligible or no pedal setback.

BRIEF SUMMARY OF THE INVENTION

The present invention addresses the above-described deficiencies as well as other deficiencies associated with the prior art. In an aspect of the present invention, a rear suspension is provided which is disposed between a front frame and a rear frame of the bicycle. In particular, the suspension system may comprise an upper link which is pivotablly connected to both the front frame (i.e., at the seat tube) and the rear frame at a front upper pivot point and a rear upper pivot point, respectively. Also, a shock absorber may be pivotally connected to the upper link opposite from the rear upper pivot point with respect to the seat tube. This creates a lever by which the shock absorber can absorb any impact shocks received through the rear wheel and rear frame.

The suspension system may also comprise a lower link pivotally connected to the front frame and the rear frame at a front lower pivot point and a rear lower pivot point, respectively. The lower link maintains a constant distance between the rear wheel/rear sprocket and the front sprocket as the suspension system absorbs impact forces (i.e., as the rear wheel travels up and down). As such, the rider only experiences a negligible amount of pedal setback.

This is achieved by interconnecting the lower link to the upper link via a tie link. The lower link, the upper link and the tie link which interconnects the lower link and the upper link regulate the path of the rear sprocket as the rear wheel rides over the uneven terrain of the bike trail and as the rear frame is re-stabilized. In particular, when the rear wheel rides over the uneven terrain, the rear sprocket rotates about the front sprocket. Since the rear sprocket/rear wheel is also connected to the upper link and a shock absorber, any shocks are absorbed into the shock absorber. However, the rear wheel moves closer to the front frame due to the rotation of the upper link. To counteract the forward movement of the rear sprocket, the upper link is also connected to the tie link and the lower link. The tie link applies a corresponding force on the lower link when the rear wheel is rotated about the front sprocket. Since the lower link is initially angled downwardly, the rotation of the lower link moves the rear wheel/rear sprocket away from the front sprocket. Accordingly, the upper link which moves the rear wheel closer to the front sprocket is balanced by the lower link which moves the rear wheel away from the front sprocket, and vice versa. Hence, negligible pedal setback occurs as the suspension system absorbs impact shocks and restabilizes.

Also, the tie link applies equalizing forces to the lower link and the upper link to stabilize the forces imposed on the rear frame due to pedal forces and the rider's weight. In particular, the rider's weight exerts an upward force on the tie link due to the clockwise rotation of the upper link and the lower link when the rider sits on the bike seat. In contrast, the pedaling forces exert a downward force on the tie link due to the counterclockwise rotation of the upper link and the lower link when the rider pedals. These upward and downward forces are equalized through the tie link so as to provide the rider with a smoother ride and negligible pedal setback.

BRIEF DESCRIPTION OF THE DRAWINGS

These as well as other features of the present invention will become more apparent upon reference to the drawings wherein.

DETAILED DESCRIPTION OF THE INVENTION

Figure 1:
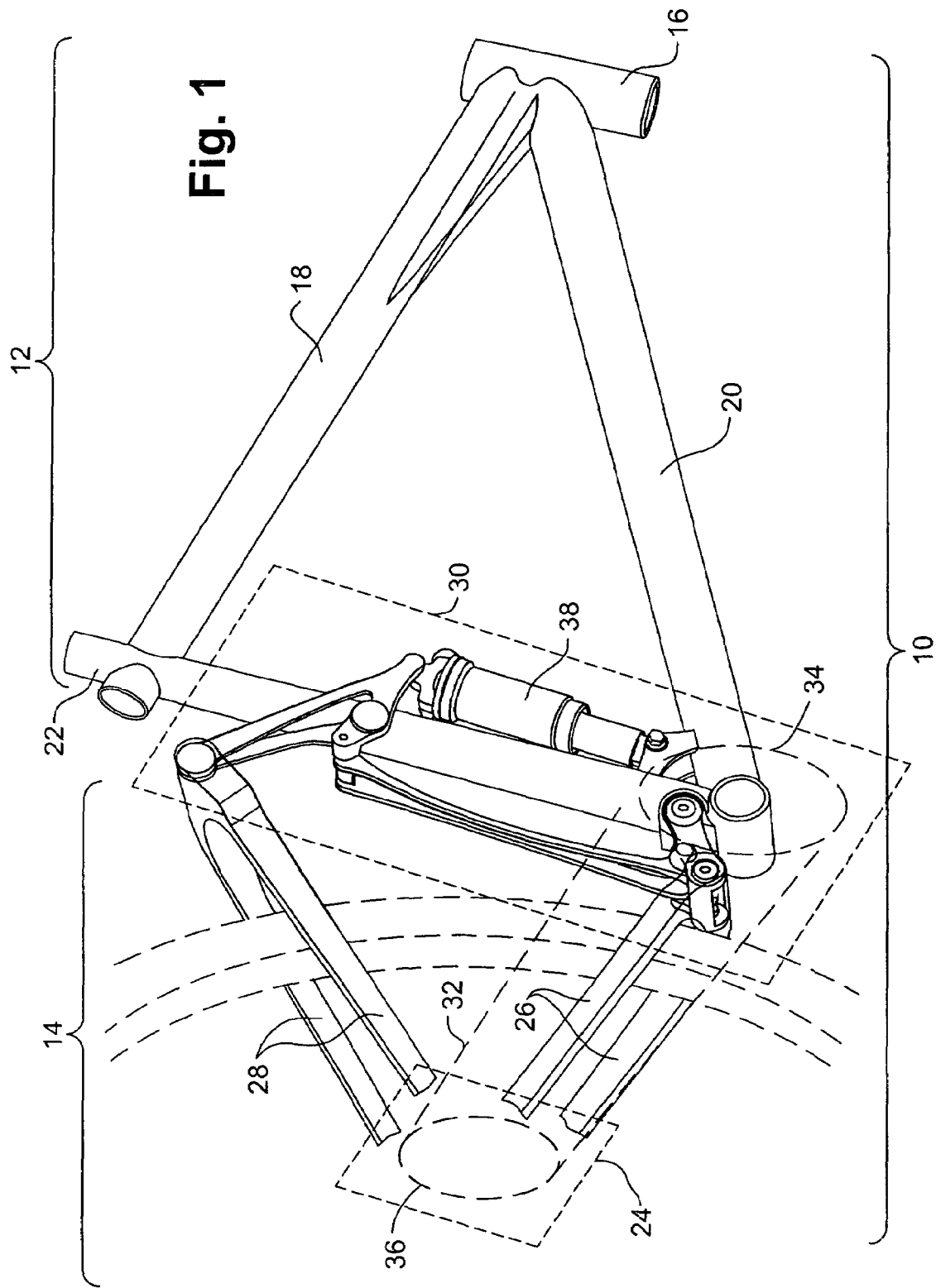
FIG. 1 is a rear perspective view of a front frame connected to a suspension system of a rear frame.

The drawings referred to herein are for the purposes of illustrating the various aspects of the present invention and are not meant to limit the scope of the present invention. Referring now to FIG. 1, a bicycle 10 is shown having a front frame 12 and rear frame 14. The front frame 12 has a head tube 16, a top tube 18, a down tube 20 and a seat tube 22. The head tube 16 contains a head set which provides the interface with the bicycle forks, front tire and handle bar. The top tube 18 connects the head tube 16 to the seat tube 22 at the top, and the down tube 20 connects the head tube 16 to the seat tube 22 at the bottom. Accordingly, the front frame 12 may have a triangular configuration. However, it is also contemplated within the scope of the present invention that the various aspects of the present invention may be employed with a front frame 12 having a configuration other than a triangular configuration.

The rear frame 14 is connected to the rear dropouts 24 (see FIGS. 1 and 3), where the rear wheel is rotateably connected. The rear dropouts 24 are more clearly shown in FIG. 3 and disposed on opposed sides of the rear wheel. The rear frame 14 has a pair of chain stays 26 and a pair of suspension stays 28. The chain stays 26 connect a suspension system 30 of the bicycle 10 to the rear dropouts 24 and run parallel to a chain 32 on opposed sides of the rear wheel. The suspension stays 28 run diagonally downward on opposed sides of the rear wheel also connecting the suspension system 30 of the bicycle 10 to the rear dropouts 24. Accordingly, as shown in FIG. 1, the rear frame 14 is independent from the front frame 12 in that they 12, 14 are not directly connected to each other 12, 14 but are connected to each other 12, 14 via the suspension system 30. This provides for a bicycle 10 which exhibits negligible pedal setback when the rear wheel rides over bumps (e.g., boulders) along the bike trail. As such, the power generated by the rider is efficiently transferred through the crank to the rear wheel.

The suspension system 30 is disposed between the front frame 12 and the rear frame 14. The suspension system 30 is pivotably attached to both the front frame 12 and the rear frame 14 and absorbs any impact forces when the rear wheel rides over bumps along the bike trail. For example, as the rider rides along the bike trail, the front wheel may go over a bump along the bike trail. The impact force of the bump on the front wheel may be absorbed by front shocks. The bump may then impact the rear wheel pushing the rear wheel and the rear frame 14 in a generally upward direction. However, since the rear wheel and rear frame 14 are independent from the front frame 12, the impact force from the bump is transferred into a shock absorber 38 of the suspension system 30. Hence, the rider does not feel the impact of the bump on the rear wheel as much as if the rider had been riding a hardtail bike.

The suspension system 30 of the present invention also creates a negligible amount of pedal setback caused by the impact force of the bump on the rear wheel. Pedal setback may be caused by chain growth/reduction between the front sprocket 34 and the rear sprocket 36 as the rear wheel rides over bumps along the bike trail. For example, in prior art suspension systems, the rear wheel and the rear frame are generally pushed upward when the bike's rear wheel impacts a bump. The rear wheel which is also connected to the rear sprocket does not maintain the same distance to the front sprocket as the rear wheel is pushed upward. Since the front sprocket and rear sprocket are connected to each other via a chain, any changes in distance from the front sprocket to the rear sprocket cause the pedal to advance or retract (i.e., pedal setback). The advancement and/or retraction of the pedal must be absorbed by the rider. In the present invention, pedal setback is reduced such that the pedaling force of the rider is more efficiently transferred to the rear wheel compared to prior art bikes with a rear suspension system.

Figure 2:
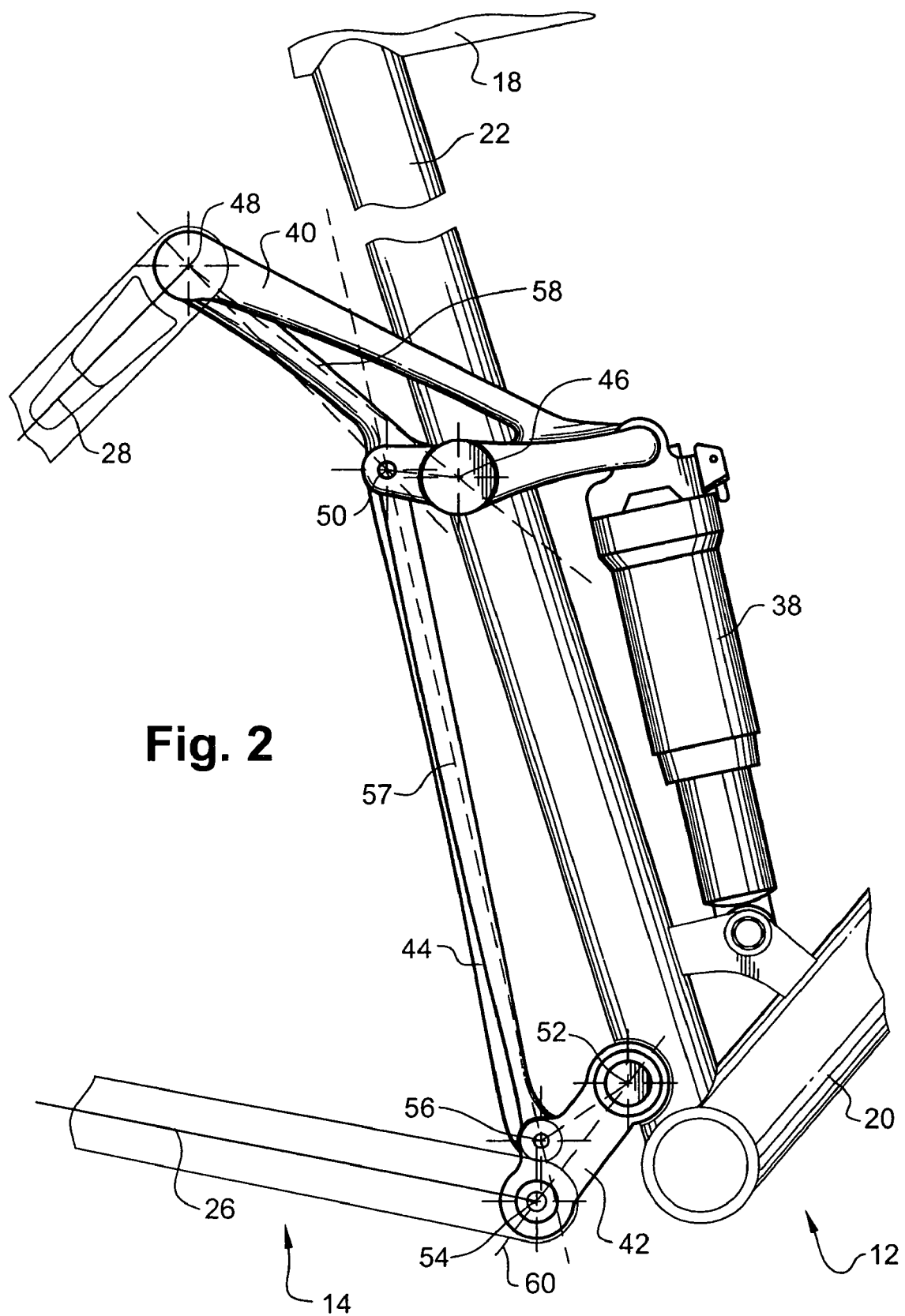
FIG. 2 is a front plane view of the suspension system.

Referring now to FIG. 2, the suspension system 30 may comprise an upper link 40, lower link 42, tie link 44, and the shock absorber 38 which are pivotably connected to each other as well as the front and rear frames 12, 14 to provide for a bicycle suspension system 30 which reduces the amount of pedal setback compared to prior art suspension systems. The upper link 40 is pivotably connected to the front frame 12 at a front upper pivot point 46, the rear frame 14 at a rear upper pivot point 48 and the tie link 44 at a top pivot point 50. The lower link 42 is also pivotably connected to the front frame 12 at a front lower pivot point 52, the rear frame 14 at a rear lower pivot point 54 and the tie link 44 at a bottom pivot point 56. The shock absorber 38 may be connected to the upper link 40 to absorb energy transferred to the rear frame 14 when the rear wheel rides over a bump along the trail.

The upper link 40 is connected to the front frame 12, rear frame 14 and tie link 44 at the front upper pivot point 46, the rear upper pivot point 48 and the top pivot point 50, respectively. These points 46, 48, 50 as shown in FIG. 2 have a triangular configuration. Also, the lower link 42 is connected to the front frame 12, rear frame 14 and tie link 44 at the front lower pivot point 52, rear lower pivot point 54 and the bottom pivot point 56, respectively. These points 52, 54, 56 as shown in FIG. 2 also have a triangular configuration. The upper link and the lower link may be pivotally connected to each other through the tie link 44. The tie link 44 defines the direction of forces exerted on the upper link 40 and the lower link 42 by the tie link 44. The direction of the forces is along a tie link line 57 which extend between the front and rear upper pivots points 46, 48 of the upper link 40 and the front and rear lower pivot points 52, 54 of the lower link 42. The relationships assist in maintaining the distance between the rear wheel/rear sprocket 36 and the front sprocket 34 such that the rider experiences negligible to no pedal setback.

Furthermore, the front upper pivot point 46 and the rear upper pivot point 48 may define an upper base line 58 extending through these points 46, 48, and the front lower pivot point 52 and the rear lower pivot point 54 may define a lower base line 60 extending through these points 52, 54. The top pivot point 50 may be located under the upper base line 58 and disposed between the upper base line 58 and the lower base line 60. Similarly, the bottom pivot point 56 may be located above the lower base line 60 and disposed between the lower base line 60 and the upper base line 58. These relationships between the pivot points 46, 48, 50, 52, 54, 56 assist the rear sprocket 36 (see FIG. 1) to substantially maintain its distance to the front sprocket 34 (see FIG. 1) when the rear wheel and rear frame 14 are pushed upwardly by a bump along the bike trail path. As such, the rider experiences negligible pedal setback as the rider rides over bumps along the bike trail path. Also, the shock absorber 38 is connected to the upper link 40 and designed to absorb the impact energy transferred into the rear frame 14 when the bump impacts the rear wheel.

Figure 3:
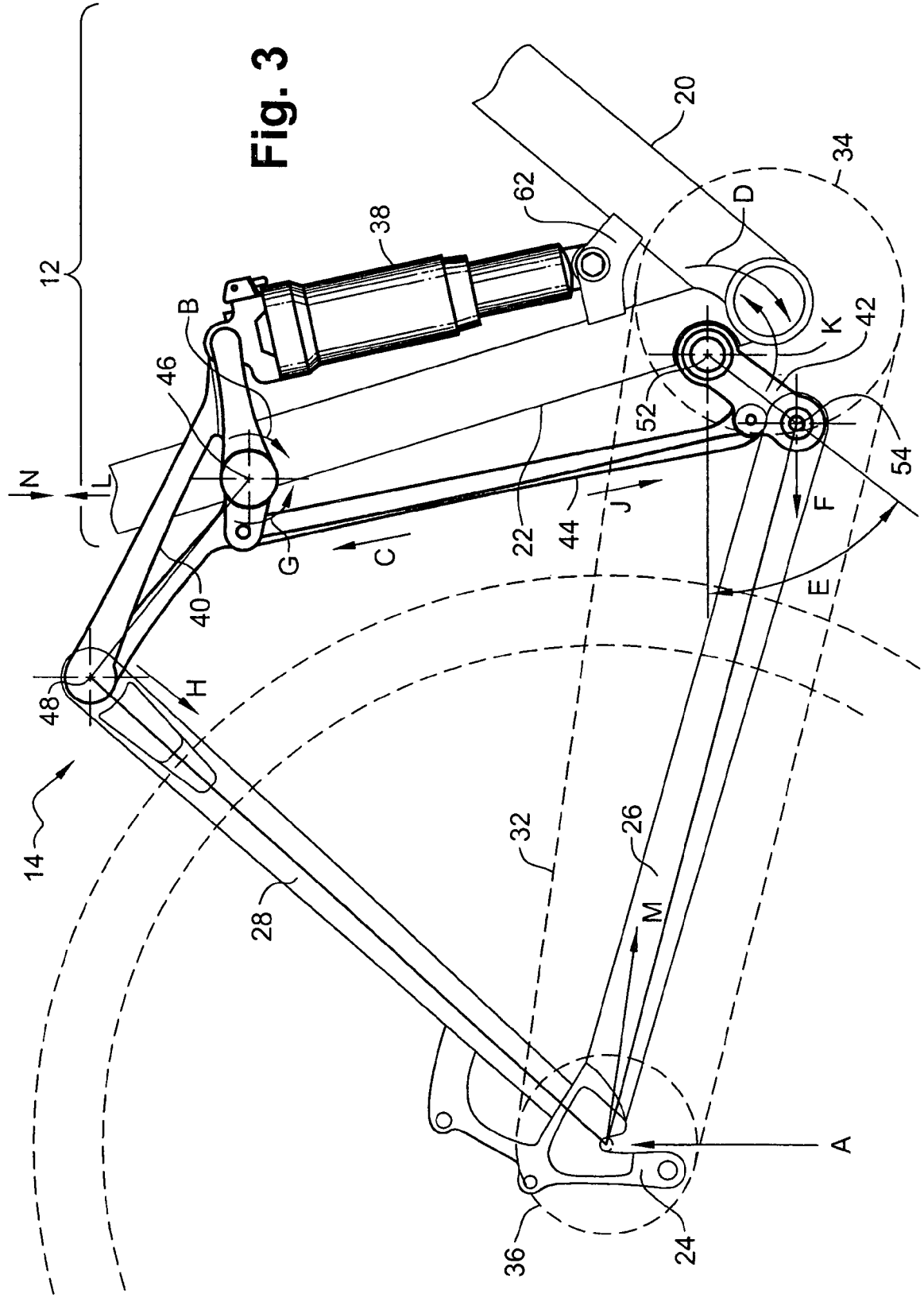
FIG. 3 is a front plane view of the rear frame and suspension system.

Referring now to FIG. 3, the distance between the front sprocket 34 and the rear sprocket 36 may be substantially maintained throughout the upward and downward travel of the rear wheel when a bump along the bike trail path impacts the rear wheel. In particular, when the bump impacts the rear wheel, the rear frame 14 is quickly pushed upwardly in the direction of arrow A causing the upper link 40 to rotate clockwise in the direction of arrow B about the front upper pivot point 46. The rear upper pivot point 48 rotates clockwise about the front upper pivot point 46 thereby traversing the rear sprocket 36 closer to the front frame 12 in the horizontal direction. Since the shock absorber 38 is located opposite to the front upper pivot point 46, the shock absorber 38 absorbs the impact force of the bump. Additionally, the tie link 44 is also pushed upwardly in the direction of arrow C causing the lower link 42 to rotate in a clockwise direction in the direction of arrow D about the front lower pivot point 52. The lower link 42 is initially positioned at a negative angle E in relation to the horizontal plane. As such, when the lower link 42 is rotated in clockwise direction D, the rear lower pivot point 54 is traversed away from the front frame 12 in the direction F. The traversal of the rear sprocket closer to the front frame 12 and of the rear lower link pivot point 54 away from the front frame 12 substantially maintains the distance between the front sprocket 34 and the rear sprocket 36 such that there is no chain growth therebetween 34, 36 and the rider experiences only a negligible amount of pedal setback.

After the impact force of the bump has been absorbed by the shock absorber 38, the shock absorber 38 rotates the upper link 40 in a counter-clockwise direction G pushing the rear upper link pivot point 48 downwards and away in the direction H from the front frame 12. This downward motion traverses the rear sprocket away from the front frame 12. Additionally, the counter clockwise rotation of the upper link 40 pushes the tie link 44 downward in direction J as well. The tie link 44 being connected to the lower link 42 rotates the lower link 42 in a counter clockwise direction K which traverses rear lower pivot point closer 54 to the front frame 12. This traverses the rear sprocket 36 closer to the front sprocket 12. The traversal of the rear upper pivot point 48 away from the front frame 12 and the rear lower pivot point 54 closer to the front frame 12 maintains the distance between the front sprocket 34 and the rear sprocket 36 such that the rider experiences only a negligible amount of pedal set back. As such, the suspension system 30 efficiently transfers the pedal power generated by the rider through the crack and into the rear wheel to propel the rider and bike along the bike trail effortlessly as the suspension system 30 absorbs the impact force of the bump and re-stabilizes.

The suspension system 30 also equalizes the pedal forces generated by the rider and the rider's weight. The pedal forces generated by the rider during pedaling generally cause the seat of the bike 10 to rise upwardly in direction L. The reason is that chain 32 attempts to pull the rear sprocket 36 forward in direction M when the rider is pedaling thus causing a counter clockwise rotation in direction K of the lower link 42 about the front lower pivot point 52 and a downward force on the tie link 44 causing the rear wheel to push down on the bike trail. In contrast, the rider's weight pushes down on the bike's seat in direction N causing the upper link 40 to rotate in a clockwise rotation in direction B about the front upper pivot point 46 and exert an upward force on the tie link 44. Accordingly, the tie link equalizes the upward force imposed on the tie link 44 by the rider's weight and the downward force imposed on the tie link 44 by the pedal forces.

The suspension system 30 may also be improved by fabricating the rear frame 14, and more particularly, the chain stays 26 and/or the suspension stays 28 from carbon fiber to allow the rear frame 14 to flex as the rear frame 14 is pushed upwardly and downwardly. This allows the rear frame 14 to absorb shocks in addition to the shock absorber 38. For example, when the rear wheel rides over a bump, the rear frame 14 may bend slightly to absorb the impact of the bump. Additionally, the carbon fiber allows the rear frame 14 to compensate for any imbalance between the rotations of the upper link 40 and the lower link 42.

The shock absorber 38 may be attached to the upper link 40. The attachment point is on the opposite side of the rear upper pivot point 48. This provides a lever mechanism such that the energy causing the upward movement of the rear frame 14 is transferred into the absorber 38. By way of example and not limitation, the shock absorber 38 may be a gas shock. The shock absorber 38 may also be adjustable by pumping the shock absorber with additional air or releasing air from the pressure chamber of the shock absorber 38. The shock absorber 38 may also be connected to the front frame 12, and more particularly, to the front frame 12 at a junction defined by the seat tube 22 and the down tube 20. As shown in FIG. 3, the shock absorber is connected to a bracket 62 welded to the junction of the seat tube 22 and the down tube 20.

The upper link 40, lower link 42, tie link 44, rear frame 14, front frame 12, and the shock absorber 38 are all pivotablly connected to each other. These pivotal connections may be accomplished with ball bearings to provide minimal friction between the respective parts to allow the most efficient transfer of energy into the shock absorber.

Additional modifications and improvements of the present invention may also be apparent to those of ordinary skill in the art. Thus, the particular combination of parts and steps described and illustrated herein are intended to represent only certain embodiments of the present invention, and is not intended to serve as limitations of alternative devices or methods within the spirit and scope of the invention.

What is claimed is:

1. A suspension system comprising:
   a) a front frame;
   b) a rear frame;
   c) an upper link pivotably attached to the front frame at a front upper pivot point and the rear frame at a rear upper pivot point, the front and rear upper pivot points defining an upper base line;
   d) a lower link pivotably attached to the front frame at a front lower pivot point and the rear frame at a rear lower pivot point, the front and rear lower pivot points defining a lower base line; and
   e) a tie link pivotably attached to the upper link at a top pivot point and the lower link at a bottom pivot point, the top and bottom pivot points disposed between the upper base line and the lower base line.

2. The system of claim 1 wherein the rear upper pivot point, the front upper pivot point and the top pivot point forms a triangle.

3. The system of claim 2 wherein the rear lower pivot point, the front lower pivot point and the bottom pivot point forms a triangle.

4. The system of claim 3 wherein forces acting on the top pivot point and the bottom pivot point are directed toward each other.

5. The system of claim 1 wherein the rear frame has a V shaped configuration.

6. The system of claim 1 wherein the rear frame is fabricated from carbon fiber.

7. The system of claim 1 further comprising a shock absorber pivotally connected to the upper link and the front frame to absorb any impact forces imposed on a rear wheel of a bicycle.

8. The system of claim 1 wherein the front frame is independently connected to the rear frame via the upper and lower links.

9. A suspension system comprising:
   a) a front frame;
   b) a rear frame;
   c) an upper link pivotably attached to the front frame at a front upper pivot point and the rear frame at a rear upper pivot point;
   d) a lower link pivotably attached to the front frame at a front lower pivot point and the rear frame at a rear lower pivot point; and
   e) a tie link pivotably attached to the upper link at a top pivot point and the lower link at a bottom pivot point;
   f) wherein a tie link line defined by the top and bottom pivot points extend between the front and rear upper pivot points of the upper link and the front and rear upper pivot points of the lower link.

10. The system of claim 9 wherein the front and rear upper pivot points define an upper base line, the front and rear lower pivot points define a lower base line, and the top and bottom pivot points are disposed between the upper base line and the lower base line.

* * * * *